May 2, 1967     D. L. ENSLEY     3,316,755
TWO-CRYSTAL INTERFEROMETER
Filed July 29, 1963
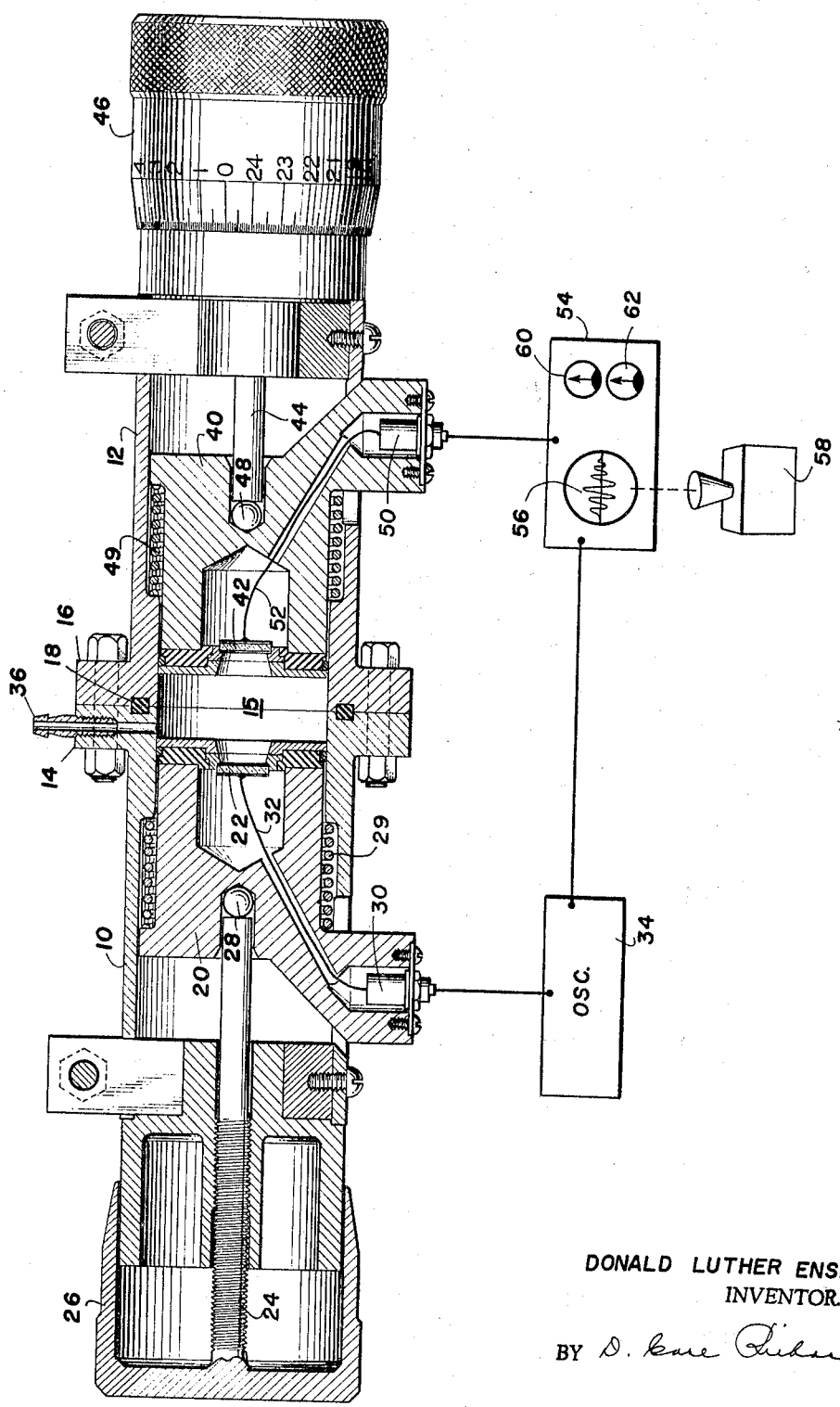
DONALD LUTHER ENSLEY
INVENTOR.

United States Patent Office 3,316,755
Patented May 2, 1967

3,316,755
TWO-CRYSTAL INTERFEROMETER
Donald Luther Ensley, Hurst, Tex., assignor, by direct and mesne assignments, to Harvest Queen Mill & Elevator Company, Dallas, Tex., a corporation of Texas
Filed July 29, 1963, Ser. No. 298,201
3 Claims. (Cl. 73—67.5)

This invention relates to the determination of the velocity of propagation and absorption of acoustic energy in liquids. In a more specific aspect, the invention relates to a precise interferometer including two piezoelectric transducers mounted at opposite ends of a transmission column.

In many areas of investigation, the acoustic transmission properties of solids and liquids become of vital importance. Various measuring and testing approaches have been employed in the past. The present invention is directed to an improved interferometer in which the path length between a transmitting transducer and a receiving transducer is variable and may be accurately measured by use of micrometer type, adjustable means located at opposite ends of a transmission column.

More particularly, in accordance with the present invention, there is provided an elongated cylinder with closure means for the cylinder. At least one closure means is adjustable longitudinally of the axis of the cylinder. Acoustic transducers are mounted at the axis of the cylinder in each of the closure means. Means is provided for energizing one of the transducers and for measuring the output of the other of the transducers in response to energization from the transducers. Micrometer type, adjustable means is provided for moving at least one of the transducers to vary the spacing between the transducers.

For a more complete undesrtanding of the present invention and for further objects and advantages thereof, reference may now be had to the following description taken in conjunction with the accompanying drawing in which:

The single figure in the drawing is a longitudinal cross-sectional view of one embodiment of the present invention.

Referring to the drawing, a pair of elongated cylinders 10 and 12 have confronting flanged ends 14 and 16 which may be bolted together to form an internal cavity 15 therein. A suitable O-ring 18 is provided for assuring a fluid-tight seal between the ends when the flanges 14 and 16 are bolted together cylinders 10 and 12 have reentrant internal bores.

A movable end closure member 20 is mounted in the cylinder 10 as to provide a fluid-tight barrier therein. A piezoelectric transducer 22 is mounted in the end closure member 20 at the axis of the cylinder 10. A threaded member 24 is secured to a micrometer type head 26, mounted at the end of the cylinder 10 opposite the closure member 20. A follower 28 is secured in the end closure member 20 so that the micrometer head 26 may be adjusted to vary the position of the stop member 20 in the cylinder 10. A spring 29 between confronting shoulders on the wall of cylinder 10 where the bore is reentrant and on the periphery of member 20 urges member 20 toward follower 28. A plug 30 is connected by way of cable 32 to provide for connection from a suitable energizing source 34 to the transducer 22.

A fluid inlet port is provided by means of a short tube 36 which extends into the cylinder 10 through the edge of the flange 14. Thus, an acoustic transmission fluid may be introduced into the cavity 15.

The cylinder 12 includes structure which is identical to that shown for the cylinder 10. More particularly, an end closure member 40 is provided to close the end of the cylinder 12 adjacent to the flange 16. A transducer 42 is mounted in the closure member 40 at the axis of the cylinder 12. A threaded member 44 is coupled to a micrometer adjustment device 46. A follower 48 is provided in a coupled relation to the end closure member 40 so that the transducer 42 may be adjustably positioned along the length of the cylinder 12. Spring 49 assures contact between member 40 and follower 48. A plug 50 is provided for connecting the transducer 42 as by way of cable 52 to a suitable measuring system 54.

In operation, ultrasonic energy is produced by excitation of the transducer 22 from source 34. The ultrasonic energy is radiated from transducer 22 and is received by transducer 42. The time required for radiated energy to travel the given distance between the transducers 22 and 42 may be used to compute the velocity of propagation for any given transmission body such as the liquid placed in the cavity 15 between the end closure members 20 and 40. Two methods may be followed in utilizing the foregoing system for determining the velocity. A pulse technique is employed for measuring phase velocity. A continuous or standing wave technique is employed for measuring group velocity.

In accordance with the first method, a pulsed energy is supplied from the source 34 and is fed to the driving transducer 22 by way of cable 32. By this means, pulsed mechanical vibrations corresponding to the electrical impulses applied to the transducer are produced in the liquid medium between the transducers 22 and 42. After a time T, the pulses reach the receiving transducer 42 to convert the mechanical vibrations into an electrical output signal. The signal is generated on a time base and may be displayed on an oscilloscope and/or photographed by a camera 58. If the distance between the transducers 22 and 42 is changed to new lengths, the electrical output signal will be observed on oscilloscope 56 in the measuring system 54 to move along the time base from its first position to new positions. The velocity of propagation of the liquid may now be determined by the relation $$c = \frac{X_2 - X_1}{t_2 - t_1} \quad (1)$$

where:

$X_1$ is a close spacing between the transducers 22 and 42;
$X_2$ is a larger spacing between transducers 22 and 42;
$t_1$ is the travel time between transducers 22 and 42 for distance $X_1$, and
$t_2$ is the travel time of a pulse between transducers 22 and 42 for spacing $X_2$.

The phase velocity $c$ is thus readily obtainable from measurements embodying the settings of the micrometer units 26 and 46.

In accordance with the method of measuring group velocity, the source 34 is a variable frequency alternating current source for producing sinusoidal waves in the ultrasonic frequency range. The measuring system 54 includes a frequency meter 60 and an electrical output meter. The transmitting transducer 22 is driven by a continuous sine wave output from the source. Forced mechanical vibrations are then transmitted from the driving transducer 22 to the receiving transducer 42 and are reflected back towards the source 22, thereby setting up a standing wave of ultrasonic pressure in the fluid column. If the path length through the liquid is made progressively smaller, the alternating current pressure at the receiving transducer will pass through a maximum whenever $$\frac{wX}{c} = \left[\frac{2n+1}{2}\right] \quad (2)$$

The distance between the maxima is one-half of a wave length for the propagated frequency. The group velocity of propagation is then $$c = \left[\frac{2X}{n}\right] f \qquad (3)$$

where:

$f$ is frequency, and
$n$ is an integer equal to the number of maxima in the distance X.

The pulse method and the standing wave method above-described are also useful in the determination of the attenuation of a given medium versus frequency with respect to ultrasonic propagation in liquids. When pulse vibrations are transmitted through the interferometer, the amplitude of the received pulses is observed to diminish with increasing path length X. If the amplitude at path length $X_1$ is $p_1$ and the amplitude at a path length $X_2$ is $p_2$, then the attenuation may be computed as follows:

$$x = \frac{20 \log (p_1/p_2)}{X_1 - X_2} \frac{db}{in.} \text{ or } \frac{1 n p_1/p_2}{X_2 - X_1} \text{ nep./meter} \qquad (4)$$

A determination of the absorption coefficient by the standing wave method involves a determination of the ratio of maximum and minimum amplitudes as the path length X is varied. The voltage output of the receiving transducer is first measured at some path length $X_1$, where a minimum amplitude $V_n$ is observed. Then the voltage output is measured at a path length $$X = (X_1 + \lambda/4) \qquad (5)$$

where $\lambda$ is wave length.

At this point, a maximum amplitude $V_m$ occurs. A plot is then made of the inverse hyperbolic tangent $(\tanh^{-1})$ of the ratio $(V_n/V_m)$ as ordinates and with path length X as abscissae. The slope of the resulting straight line is the attenuation constant. This procedure may be repeated for several frequencies to obtain a plot of the attenuation versus frequency.

Further, the system is suitable for determination of the acoustic impedance of solids. Several specimens of a material differing in length may be employed. In one embodiment of the invention, specimens were one-half inch in diameter and of lengths from about one-eighth inch to one-half inch. The specimens were successively fitted into the interferometer with the ends projecting into the funnel-shaped recesses leading to transducers 22 and 42. With the cavity 15 filled with fluid, the micrometers were adjusted snugly to fit the solid cylinders in fluid-coupled relation to the transducers. The coupling to the piezoelectric transducers 22 and 42 was by fluid between the end of the specimen and the faces of transducers 22 and 42. The fluid coupling was used because air does not provide effective transmission of acoustic waves at high frequency. The measurements involved were substantially the same as those above described for liquids, once the system is adjusted for acoustic coupling to the solid bodies.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A system for measuring transmission of acoustic energy through a solid body which comprises:
   (a) a pair of like cylinders each having an open flanged end and a closed end,
   (b) movable closure means for each of said cylinders adjustable longitudinally of said cylinders adjacent to the open ends having conical recesses therein,
   (c) acoustic transducers, one mounted at the axis in each of said closure means in said conical recesses as to be in fluid coupled to said solid body supported in said recesses,
   (d) means coupling the flanges together to form a closed chamber between said closure means,
   (e) means for energizing one of the transducers,
   (f) means for measuring the voltage generated by the other of said transducers,
   (g) duct means for introducing said liquid into said cylinders between said transducers, and
   (h) micrometer means at each said closed end respectively connected to the closure means for varying in measured amounts the spacing between said transducers.

2. A system for measuring transmission of acoustic energy through a liquid which comprises:
   (a) a pair of like cylinders each having the open flanged end and a closed end with bores and reentrant from the end opposite said open end,
   (b) movable closure means for each of said cylinders adjustable longitudinally of said cylinders adjacent to the open ends and with resilient means positioned in the reentrant portions to urge the movable closure means away from said flanged ends,
   (c) an acoustic transducer mounted at the axis in each of said closure means,
   (d) means coupling the flanges together to form a closed chamber between said closure means,
   (e) means for energizing one of the transducers,
   (f) means for measuring the voltage generated by the other of said transducers,
   (g) duct means for introducing said liquid into said cylinders between said transducers, and
   (h) micrometer means opposing the forces of said resilient means at each said closed end and respectively connected to the closure means for varying in measured amounts the spacing between said transducers.

3. The combination set forth in claim 2 in which said source means is a unidirectional pulse source for measurement of phase velocity.

References Cited by the Examiner

Carlin, B., Ultrasonics, McGraw-Hill, New York, 1960, pages 151 and 152.

Litovitz, T. A., et al., Effect of Pressure on Sound Propagation in Water, Journal of Applied Physics, volume 26, No. 7, July 1955, pages 816–820.

Greenspan, M., Propagation of Sound in Rarefied Helium, The Journal of the Acoustical Society of America, volume 22, No. 5, September 1950, pages 568–571.

RICHARD C. QUEISSER, *Primary Examiner.*

J. P. BEAUCHAMP, *Assistant Examiner.*